United States Patent [19]

Sutton

[11] Patent Number: 4,779,821
[45] Date of Patent: Oct. 25, 1988

[54] SMALL VEHICLE ROLL CONTROL AND STEERING

[75] Inventor: Trevor G. Sutton, Maricopa, Ariz.

[73] Assignee: Allied Signal Inc., Morris Township, Morris County, N.J.

[21] Appl. No.: 9,102

[22] Filed: Jan. 28, 1987

Related U.S. Application Data

[63] Continuation of Ser. No. 731,809, May 7, 1985, abandoned.

[51] Int. Cl.⁴ ............................................. B64C 15/00
[52] U.S. Cl. .................................. 244/52; 244/322; 244/169; 244/78
[58] Field of Search ................. 244/3.22, 51, 52, 169, 244/78, 3.21

[56] References Cited

U.S. PATENT DOCUMENTS

| | | |
|---|---|---|
| 2,941,764 | 6/1960 | Lee, Jr. et al. . |
| 3,034,434 | 5/1962 | Swaim et al. . |
| 3,099,960 | 8/1963 | Bryan ........................ 244/52 |
| 3,115,887 | 12/1963 | McCorkle . |
| 3,137,464 | 6/1964 | Horton ........................ 244/78 |
| 3,246,863 | 4/1966 | Posingies ..................... 244/52 |
| 3,278,140 | 10/1966 | Evans . |
| 3,592,383 | 7/1971 | Ringwall ...................... 244/78 |
| 3,612,442 | 10/1971 | Chisel . |
| 3,645,475 | 2/1972 | Stripling . |
| 3,740,003 | 6/1973 | Ayre et al. . |
| 3,977,633 | 8/1976 | Keigler et al. . |
| 4,037,806 | 7/1977 | Hirsch et al. . |
| 4,054,254 | 10/1977 | Cole . |
| 4,078,495 | 3/1978 | Ledden .......................... 244/3.22 |
| 4,211,378 | 7/1980 | Crepin . |
| 4,264,907 | 4/1981 | Durand et al. . |
| 4,399,962 | 8/1983 | Wedertz et al. . |
| 4,549,707 | 10/1985 | Daukas . |

OTHER PUBLICATIONS

Aviation Week & Space Technology/Jun. 22, 1987, "RAM Program Achieves Successes Following Near Cancellation" pp. 57–61.

Primary Examiner—Sherman D. Basinger
Assistant Examiner—Lynn M. Fiorito
Attorney, Agent, or Firm—Terry L. Miller; James W. McFarland

[57] ABSTRACT

An automotive vehicle is subject to attitude control input impulses effective only with respect to a roll axis and a selected one of a pitch and yaw axis. A selected and controlled sequencing of roll attitude control allows attitude control also of both the selected one axis and the other of the pitch and yaw axis for the vehicle.

18 Claims, 2 Drawing Sheets

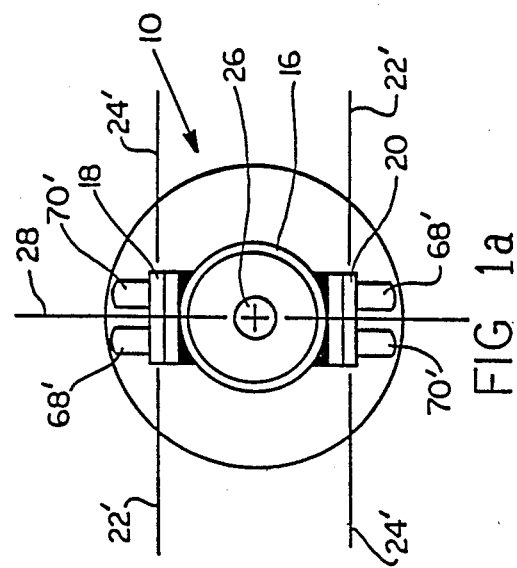
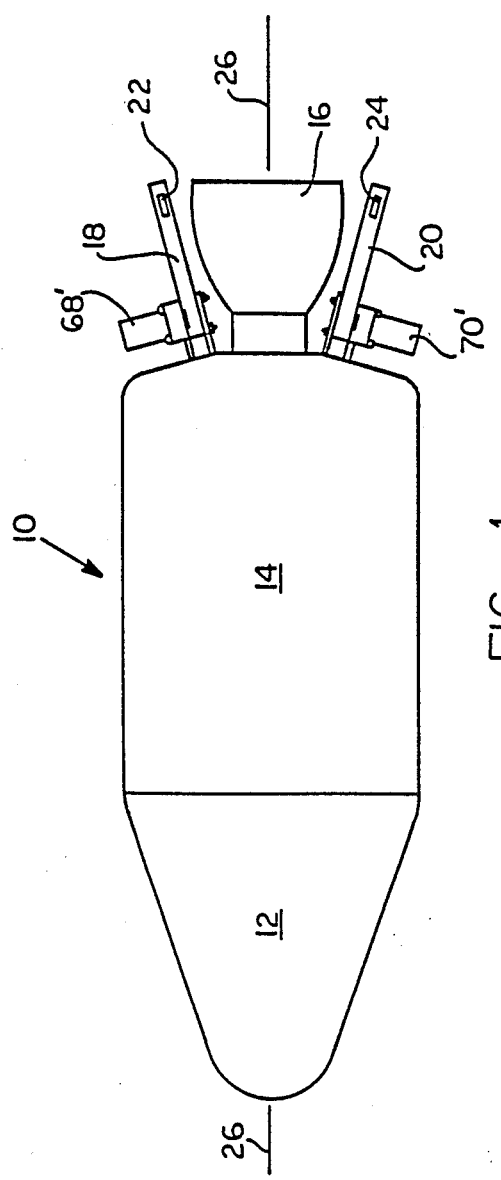
FIG 1a
FIG 1

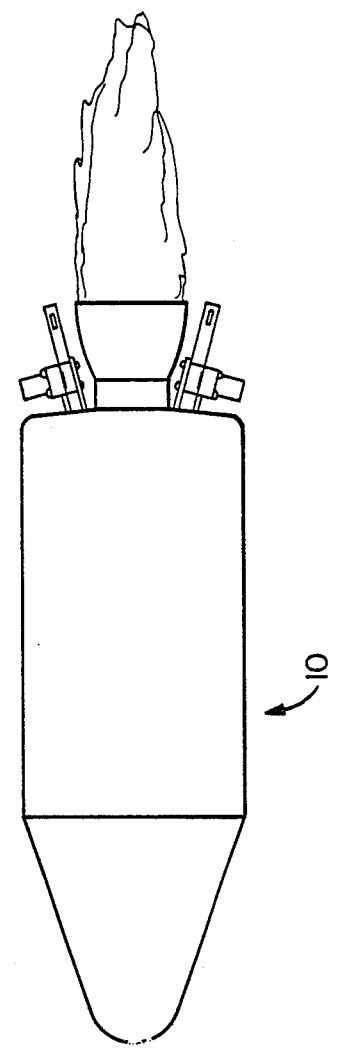
FIG 3a
FIG 3b
FIG 3c
FIG 3d
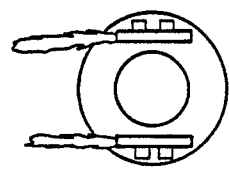
FIG 2

SMALL VEHICLE ROLL CONTROL AND STEERING

This application is a continuation of application Ser. No. 731,809, filed May. 7, 1985, and now abandoned.

BACKGROUND OF THE INVENTION

The field of the present invention is jet reaction thrust control of attitude (pitch, yaw and roll) of a moving body. More particularly, the present invention relates to jet reaction thrust control of a vehicle wherein successively oppositely directed and selectively variable impulse bits are applied to the vehicle. The vehicle comprises a source of pressurized motive gas communicating to pairs of attitude control nozzles which are oppositely disposed with respect to a control axis, and bistable valving controlling flow of the motive gas to the nozzles. The magnitude of the impulse bits applied to the vehicle is the time integral of thrust, and duration of thrust for each pulse. The oppositely directed thrust pulses from the attitude control nozzles are changed stepwise between near-zero, and a determined level. Because the impulse bits are applied to the vehicle in successively opposite directions, the vehicle is forced into an attitude oscillation. This attitude oscillation is known to those in the art as a limit cycle, and the control method is known as a Pulse Duration Modulation (PDM) or bang-bang system. In applications where the impulse bits are sufficiently small in comparison to the vehicle mass and are applied at a frequency above the oscillation threshold frequency of the vehicle, the latter responds only to the net average force without oscillation.

A conventional PDM vehicle control system utilizing bistable valve structure is known in accord with U.S. Pat. No. 3,278,140, issued Oct. 11, 1966 to K. C. Evans. According to the teaching of Evans, one of three bistable valves is utilized to control each one of the pitch, yaw, and roll axis of a vehicle. Each of the bistable valves comprises a body defining a nozzle directing a motive gas stream toward a splitter which defines a bifurcated flow path. Control ports are located on each side of the fluid stream as it travels toward the splitter. The chamber through which the fluid stream travels is configured to cause a vacuum in the control ports in response to flow of the fluid stream. Consequently, closing one of the control ports to atmosphere while leaving the opposite port open causes rarification switching of the fluid stream toward the closed port.

With a control scheme as taught by Evans, a vehicle must comprise at least three bistable valve apparatus to control the attitude of the vehicle in each one of the pitch, yaw, and roll axis. Consequently, the control apparatus may comprise a considerable portion of the total weight of a small vehicle. When it is desired to make a vehicle which is man-portable, or which can be carried upon other small, light-weight vehicles, the total weight of the vehicle is a critical design parameter. In such circumstances, the weight of a control device as taught by Evans may be a prohibitively large portion of the permissible vehicle weight. Of course, if the control scheme according to Evans is utilized nevertheless, the performance of the vehicle may fall short of that required.

Another aspect of the Evans control scheme which is not entirely satisfactory is the use of rarification switching of the fluid stream between its two positions within the bistable valve. Such a switching arrangement can result in the PDM characteristic of the control system being variable and dependent upon atmospheric pressure level. As a result, a vehicle which operates satisfactorily near sea level may have an unsatisfactorily slow PDM rate when used at a higher altitude.

Still another undesirable aspect of the Evans teaching when applied to small vehicles is the use of three separate motive fluid streams to effect control in the three control axes. Because each of the fluid streams must be flowing so long as control of the vehicle is to be effected, a considerable portion of vehicle total energy may be dissipated by the three streams in combination.

SUMMARY OF THE INVENTION

In view of the shortcomings of conventional control schemes when applied to small vehicles, it is an object of the present invention to provide a control apparatus and method for small light-weight vehicles which is light in weight.

Another object of the present invention is to provide a control apparatus and method of the above-described character which requires a lesser expenditure of energy from the vehicle for purposes of altitude control.

Still another object of the present invention is to provide a control apparatus and method for small vehicles which is not influenced by variations in altitude or atmospheric pressure.

The above-identified objects, and others, are satisfied by the present invention, which provides control apparatus for a small vehicle comprising a source of pressurized motive fluid, only a pair of conduits respectively communicating said motive fluid with two oppositely directed pairs of nozzles, each oppositely directed pair of said two pairs of nozzles being spaced radially outwardly of a roll axis of said small vehicle and being disposed generally perpendicularly thereto, and only a pair of bistable PDM valve means interposed respectively in said pair of conduits for controlling motive fluid flow from selected ones of said pairs of nozzles.

The present invention further provides control apparatus of the above-defined character wherein each of the bistable valve apparatus includes a branch conduit communicating pressurized motive fluid to a control port disposed intermediate a nozzle and a splitter of said bistable valve apparatus, and pilot valve means for opening and closing motive fluid flow in the branch conduit.

Still further, the present invention provides the method of controlling the attitude of a small vehicle in each of a roll, pitch, and yaw reference axis comprising the steps of providing thrust reaction means for controlling the attitude of the vehicle only about a body fixed roll axis and one of a body fixed pitch and yaw axis, controlling the attitude of the vehicle in the roll reference axis by utilization of the thrust reaction means, controlling the attitude of the vehicle in the one of the pitch and yaw reference axis by utilization of the thrust reaction means; and controlling the attitude of the vehicle in the other of the pitch and yaw reference axis by first utilizing the thrust reaction means to roll the vehicle through substantially 90 degrees, and secondly utilizing the thrust reaction means to effect control of the vehicle attitude in the other of the pitch and yaw reference axis.

An advantage of the present invention is a comparative weight reduction in a small vehicle by the elimination of one of the three sets of control valving and nozzles conventionally required. A further advantage over the conventional vehicle control teachings is a reduction by about one-third of the amount of energy required for vehicle attitude control. While the conventional control teachings utilized three motive fluid streams each vented through oppositely directed control nozzles by bistable PDM valving to effect control in the pitch, yaw, and roll axis, the present invention utilizes only two motive fluid streams. Still another advantage of the present invention over conventional bistable PDM control valving is the use of positive pressure switching of the fluid stream between the two oppositely directed nozzles. Because a control system according to the invention utilizes positive pressure switching rather than conventional rarification switching, altitude changes have no affect upon the PDM characteristic of the control system.

BRIEF DESCRIPTION OF THE DRAWING FIGURES

FIGS. 1 and 1a respectively present side and aft end views of an automotive vehicle embodying the present invention;

FIG. 2 schematically depicts the bistable valve device of the present invention; and FIG. 3 in its four subparts FIGS. 3a–3d depicts the automotive vehicle control method of the present invention.

DETAILED DESCRIPTION OF THE PREFERRED EMBODIMENT

FIG. 1 depicts a rocket-propelled automotive vehicle 10 having a forward portion 12 housing a payload for the vehicle, such as an instrumentation and guidance package. The vehicle 10 also includes an aft rocket propulsion portion 14 housing a conventional solid propellant fuel grain. The portion 14 includes an exhaust nozzle exit cone 16 communicating with the fuel grain and extending rearwardly of the vehicle. The cone 16 opens at its aft and to the atmosphere for rearwardly expelling a high velocity jet of motive fluid for forwardly propelling vehicle 10. Flanking the exit cone 16 and disposed on opposite sides thereof are only a pair of attitude control apparatus 18 and 20. The apparatus 18, 20 are substantially identical, and each communicates also with the fuel grain for selectively expelling jets of motive fluid perpendicularly to the direction of forward movement of vehicle 10 via opposed nozzle openings 22 and 24 in each apparatus.

Viewing FIG. 1a, it will be noted that the apparatus 18, 20 are each equally spaced radially outwardly of a roll axis of vehicle 10, which is referenced with numeral 26. Consequently, the nozzles 22 and 24 of each apparatus 18, 20 expel motive fluid along mutually parallel respective action lines 22', 24' which are spaced radially outwardly from the roll axis 26, and are disposed substantially perpendicularly to a radial line, referenced with numeral 28, passing centrally through the apparatus 18, 20. Similarly, the apparatus 18, 20 are disposed near the aft end of vehicle 10 so that they are behind the vehicle center of gravity (not shown) and define a lever arm relative thereto for pitch and yaw attitude change of vehicle 10.

Turning now to FIG. 2, the apparatus 18, 20 each include a continuously open inlet port 30 receiving pressurized motive fluid from the fuel grain of propulsion portion 14. Port 30 communicates with branched passage 32 having a first branch 32a communicating with a power nozzle 34 of a bistable fluidic amplifier 36. Amplifier 36 includes a deflection member 38 movably disposed in the interaction region of the amplifier to control deflection of fluid pressure into one or the other of a pair of outlet passages 40, 42. The passages 40, 42 communicate respectively with control ports 44, 46 of a downstream bistable fluidic amplifier 48. Passage branch 32b communicates with the power jet port of amplifier 48. Similarly, amplifier 48 includes outlet passages 50, 52 which communicate with control ports 54, 56 of a bistable fluidic output amplifier 58. Branch passage 32c communicates with a power jet of amplifier 58. Outlet passages 60, 62 of amplifier 58 communicate with nozzle openings 22 and 24, respectively. The apparatus 18, 20 each include a double-coil solenoid 64, including an armature 66 operatively coupled with deflection member 38, and a pair of opposed solenoid coils 68, 70. The outer housings of the solenoid coils 68, 70 are visible on FIGS. 1 and 1a and are referenced with numerals 68', 70'.

During rocket-propelled flight of the vehicle 10, the fuel grain (not shown) produces pressurized motive fluid which is expelled from the exhaust nozzle exit cone 16, as well as being continuously expelled from the attitude control apparatus 18, 20, via selected ones of the nozzle openings 22, 24, thereof. Viewing FIG. 2, it will be seen that all motive fluid received by apparatus 18, 20 flows therefrom via the nozzle openings 22, 24. If the deflection member 38 is positioned by energization of one of the solenoid coils 68, 70 to produce an output in passage 40, then the power jet of amplifier 48 is switched to produce an output in passage 52, and the output of amplifier 58 appears at nozzle opening 22. Conversely, energization of the other of the solenoid coils 68, 70 switches the outputs to passages 42 and 50, and to nozzle opening 24. In other words, the motive fluid flow through apparatus 18, 20 flows therefrom substantially all from nozzle opening 22, or substantially all from nozzle opening 24, dependent upon selective individual energization of solenoid coils 68, 70. Because the apparatus 18, 20 employ fluidic bistable pressure switching using motive fluid pressure to effect the switching, the switching rate may be very rapid and is not substantially affected by altitude change. The solenoid coils 68, 70 are controlled by PDM electrical signals supplied thereto via conductors 72 originating with a guidance device (not shown) in vehicle portion 12.

Attention now to FIG. 3 will reveal the vehicle 10 depicted as though in flight with a plume of motive fluid ejecting from exhaust nozzle exit cone 16 (FIG. 3a). Now, if the roll attitude of vehicle 10 is as depicted viewing FIG. 3b, and an upward pitch of the vehicle is commanded, the apparatus 18, 20 are PDM controlled to effect a time-integral upward reaction simultaneously from each apparatus. Thus, the aft end of vehicle 10 is forced downward, raising the forward end, and causing no roll movement of the vehicle. Accordingly, upward and downward pitch attitude control may be effected with vehicle 10 in a roll attitude as shown in FIG. 3b. On the other hand, if the vehicle 10 is in a roll attitude as depicted in FIG. 3b and a change in yaw attitude is required, the PDM signals to apparatus 18,20 effect a time-integral reaction (FIG. 3c) to roll vehicle 10 to the FIG. 3d roll attitude. The yaw attitude change is then effected, for example, rightward deflection of the vehicle flight course as depicted in FIG. 3d.

Summarizing the above, it will be recognized that the apparatus 18, 20 are disposed radially outwardly spaced from the center of gravity of vehicle 10 with respect to the roll axis, and longitudinally spaced from the center of gravity with respect to the pitch and yaw axes thereof. Therefore, by simultaneous PDM operation of the apparatus 18, 20 to effect time-integral thrust reaction in a single direction, a pitch or yaw attitude change of the vehicle 10 is effected. Similarly, by simultaneous PDM operation of the apparatus 18, 20 to effect time-integral thrust reaction each in an opposite direction, a roll attitude change of the vehicle 10 is effected.

Those skilled in the art will recognize that while pitch and yaw herein have been utilized in the conventional sense of vertical and horizontal direction change, respectively, such is not limiting on the invention. In other words, the control axes selected may be skewed with respect to the earth and are not necessarily disposed at ninety degrees to each other. Such will depend upon the particular objective for the vehicle 10. However, a salient feature of the present invention is attitude control of a vehicle with respect to control axes including a roll axis and numbering more than two, while utilizing only two motive fluid control streams selectively PDM controlled in opposite directions of discharge, and effecting roll attitude change of the vehicle in preparation for a attitude change in the pitch or yaw sense.

While the present invention has been depicted and described with reference to one particularly preferred embodiment thereof, such does not imply a limitation on the invention, and no such limitation is to be inferred. For example, while the present preferred embodiment depicts attitude thrust reaction apparatus 18, 20 disposed aft of a vehicle center of gravity, they could just as effectively be disposed forward of or at a vehicle center of gravity. The invention is intended, therefore, to be limited only by the spirit and scope of the appended claims, which also provide definition of the invention.

I claim:

1. An automotive vehicle comprising a source of pressurized motive gas; means communicating said pressurized motive gas to ambient for jet reaction propulsion of said vehicle; and only a pair of bidirectional attitude control means also continuously communicating said pressurized motive gas to ambient for when acting in substantially simultaneous unidirectional cooperation effecting an attitude change of said vehicle about one of a pitch and yaw axis, and when acting in substantially simultaneous opposition effecting an attitude change of said vehicle on a longitudinal roll axis, attitude control of said vehicle about the other of said pitch and yaw axis being effected exclusively by the same only a pair of bidirectional attitude control means after selected rolling of said vehicle to orient said attitude control means for effect about said other axis.

2. The invention of claim 1 wherein each one of said pair of attitude control means comprises means defining a pair of oppositely disposed nozzle openings spaced radially outwardly of said roll axis, and bistable valve means for selectively directing discharge of said motive fluid from one of said pair of nozzle openings.

3. The invention of claim 2 wherein each one of said pair of attitude control means is substantially equally spaced radially outwardly of said roll axis.

4. The invention of claim 3 wherein each one of said pair of attitude control means is spaced longitudinally from a center of gravity of said automotive vehicle.

5. The invention of claim 4 wherein said pair of attitude control means are disposed in diametric opposition with respect to said roll axis.

6. The invention of claim 5 wherein said oppositely directed nozzle openings of each of said pair of attitude control means is disposed substantially perpendicularly to a diametral line passing generally centrally through said pair of attitude control means.

7. The invention of claim 6 wherein each of said pair of attitude control means comprises an inlet communicating said pressurized fluid to a power jet nozzle for forming a power jet of motive fluid, a pair of receivers disposed to receive said power jet of motive fluid, deflecting means for selectively directing said power jet of motive fluid to a selected one of said pair of receivers, and means communicating said pair of receivers individually with respective ones of said nozzle openings for discharging said motive fluid therefrom.

8. The invention of claim 7 wherein said deflecting means comprises a deflecting member movable laterally of said power jet of motive fluid between said power jet nozzle and said pair of receivers.

9. The invention of claim 8 further including means for selectively moving said defecting member between a first position wherein substantially all of said power jet of motive fluid is received by a selected one of said pair of receivers, and a second position wherein substantially all of said power jet of motive fluid is received by the other of said pair of receivers.

10. The invention of claim 9 wherein said moving means comprises an electrical solenoid.

11. The invention of claim 8 wherein said deflecting means comprises a pair of control port means disposed on opposite sides of said power jet nozzle and intermediate the latter and said pair of receivers for receiving pressurized motive fluid and discharging the latter with respect to said power jet of motive fluid to deflect the latter relative said pair of receivers.

12. Control apparatus for an unrestrained moving automotive vehicle having in addition to freedom of movement in a forward direction, freedom of movement about pitch, yaw and roll axes, said apparatus consisting of a source of pressurized motive fluid, a flow path opening to propulsion nozzle means for forward propulsion of said vehicle, and only a pair of conduits opening from said motive fluid source to only two respective oppositely directed pairs of attitude control nozzles, and only a pair of bidirectional valve means interposed respectively between said pair of conduits and said two pairs of nozzles for controlling motive fluid flow from selected nozzles of said pairs of nozzles, said only two pair of attitude control nozzles being effective to control movement of said vehicle about said roll axis and one of said yaw and pitch axes, and the same only two pair of attitude control nozzles exclusively being effective to control movement of said vehicle about the other of said yaw and pitch axes after selected rolling of said vehicle to so dispose said only two pair of control nozzles.

13. The invention of claim 12 wherein said two pairs of oppositely directed nozzles are each equally spaced radially outwardly with respect to said roll axis, and are disposed parallel and substantially perpendicularly to a radial line from said roll axis.

14. The method of controlling the attitude of an automotive vehicle about each of a roll, pitch, and yaw reference axis; wherein the vehicle has body fixed roll, pitch and yaw axes, consisting of the steps of providing thrust reaction means for controlling the attitude of the vehicle only about said body fixed roll axis and only one of said body fixed pitch and yaw axis, controlling the attitude of the vehicle about the roll reference axis by utilization of said thrust reaction means, controlling the attitude of the vehicle about one of said pitch and yaw reference axis by utilization of said thrust reaction means, and controlling the attitude of the vehicle about the other of the pitch and yaw reference axis by: first utilizing the thrust reaction means to roll the vehicle through substantially ninety degrees, and thereafter utilizing only the same said thrust reaction means to effect lateral control of the vehicle attitude about the other of the pitch and yaw reference axis.

15. A method of controlling the flight direction of a free flying automotive vehicle consisting of the steps of disposing on diametrically opposite sides of a roll axis of the vehicle respective ones of only a pair of attitude control assemblies each substantially equally radially spaced from said roll axis, continuously flowing presurized motive fluid from said control assemblies along respective parallel action lines each substantially perpendicular both to said roll axis and to a diametral line connecting said control assemblies, flowing said motive fluid substantially simultaneously in a single direction from said diametrically opposed control assemblies along said action lines to effect only one of a pitch or yaw attitude change of said vehicle, flowing said motive fluid substantially simultaneously in opposite directions from said diametrically opposed control assemblies along said action lines to effect roll attitude change of said vehicle, and effecting a roll attitude change of said vehicle of essentially 90° and thereafter flowing said motive fluid substantially simultaneously in a single direction from said diametrically opposed control assemblies along said action lines to exclusively effect a change of the other of said pitch or yaw attitude of said vehicle.

16. An automotive vehicle consisting of an elongate body defining a forward end, an aft end, and an axis of propagation; means for forwardly propelling said vehicle along said axis of propagation; source means for supplying pressurized motive fluid, and attitude control means for effecting movement of said vehicle about said axis of propagation (roll) and about one of a pitch and a yaw axis perpendicular to said axis of propagation; said attitude control means consisting of only a first and a second continuously open flow path opening from said source means into respective pairs of oppositely disposed nozzle means for jet reaction discharge of said motive fluid to ambient, said pairs of oppositely disposed nozzle means being diametrically opposed with respect to said axis of propagation and equally spaced radially outwardly thereof and lying subtantially at right angles both to the latter axis and to a radial line passing centrally through said pairs of nozzle means, respective first and second two-way valve means interposed in said first and second flow paths for discharging said motive fluid from selected ones of the respective first and second pair of oppositely directed nozzle means whereby attitude control of said vehicle in all of pitch, yaw, and roll is effected by said attitude control means alone, the latter being effective to roll said vehicle by substantially simultaneous discharge of said motive fluid in opposing directions from said diametrically opposed pairs of nozzle means, and being effective for one of pitch or yaw of said vehicle by substantially simultaneous discharge of motive fluid in a single direction from said diametrically opposed pairs of nozzle means, the same attitude control means and only said respective pairs of opposed nozzle means thereof being effective for the other of pitch or yaw of said vehicle by first rolling said vehicle through substantially 90° and then discharging motive fluid in a single direction from said diametrically opposed pairs of nozzle means.

17. The invention of claim 16 wherein said first and second flow paths are disposed on diametrically opposed sides of said propulsion means.

18. A free flying vehicle comprising an elongate body having a center of gravity and an axis of propagation defining a roll axis for said vehicle; mutually perpendicular reference axes transverse to said roll axis defining respective pitch and yaw axes for said vehicle; the method of controlling flight of said vehicle along a selectively variable propagation axis by pivotal movement of said body about each of said roll, pitch and yaw axes consisting of steps of:

providing source means on said vehicle for supplying pressurized motive fluid;

providing only a pair of control flow path means extending from said source to only a respective pair of nozzle means for discharging said motive fluid;

configuring each one of said only a pair of nozzle means to respectively define only a first and a second discharge nozzle which are oppositely directed in axial projection;

disposing said only a pair of nozzle means respectively on opposite sides of and spaced radially outwardly from said roll axis and spaced longitudinally from said center of gravity, with each of said respective first discharge nozzles substantially parallel in axial projection and like disposed substantially perpendicular to a radial line from said roll axis, each of said respective second discharge nozzles therefore also being substantially parallel in axial projection and like disposed, said pair of nozzle means defining in axial projection only parallel thrust lines which are spaced from said roll axis;

effecting pitching motion of said vehicle in a selected roll orientation about said pitch axis in a first direction by flowing said motive fluid from both said first discharge nozzles along thrust lines perpendicular to said pitch axis in axial projection;

effecting pitching motion of said vehicle in said selected roll orientation about said pitch axis in a seocnd direction opposite said first direction by flowing said motive fluid from both said second discharge nozzles along thrust lines perpendicular to said pitch axis in axial projection;

effecting rolling motion of said vehicle about said roll axis in one of a chosen first or opposite second direction by respectively flowing said motive fluid from a chosen first or second discharge nozzle of one of said pair of nozzle means and from the oppositely disposed respective second or first discharge nozzle of the other of said pair of nozzle means;

effecting yawing motion of said vehicle by first effecting rolling movement thereof in a selected direction through substantially ninety degrees (90°) with respect to said selected roll orientation to dispose said thrust lines perpendicularly to said yaw axis, and thereafter effecting pitching motion of said vehicle to result in vehicle pivotal motion about said yaw axis.

* * * * *